(12) United States Patent
Moriya

(10) Patent No.: US 7,899,316 B2
(45) Date of Patent: Mar. 1, 2011

(54) LENS CONTROLLER

(75) Inventor: Chikatsu Moriya, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 389 days.

(21) Appl. No.: 11/648,782

(22) Filed: Jan. 3, 2007

(65) Prior Publication Data

US 2007/0172221 A1 Jul. 26, 2007

(30) Foreign Application Priority Data

Jan. 24, 2006 (JP) .............................. 2006-015461

(51) Int. Cl.
*G03B 17/00* (2006.01)
(52) U.S. Cl. ........................................ 396/78; 359/697
(58) Field of Classification Search .................. 396/78
See application file for complete search history.

(56) References Cited

U.S. PATENT DOCUMENTS

| 5,434,621 | A | | 7/1995 | Yu | |
|---|---|---|---|---|---|
| 5,842,056 | A | * | 11/1998 | Suzuki et al. | 396/78 |
| 6,134,390 | A | * | 10/2000 | Kasuya | 396/77 |
| 6,344,933 | B1 | * | 2/2002 | Yajima | 359/697 |
| 6,370,332 | B1 | * | 4/2002 | Kubo | 396/77 |
| 6,385,399 | B1 | * | 5/2002 | Idemura | 396/63 |
| 6,924,941 | B2 | * | 8/2005 | Okada et al. | 359/698 |
| 7,330,212 | B2 | * | 2/2008 | Tomita | 348/345 |

FOREIGN PATENT DOCUMENTS

| EP | 1 081 524 A2 | | 3/2001 |
|---|---|---|---|
| JP | 2001-42199 A | | 2/2001 |
| JP | 2001-51181 | | 2/2001 |
| JP | 2002014273 A | * | 1/2002 |
| JP | 2002182302 A | * | 6/2002 |

OTHER PUBLICATIONS

Machine translation of JP2002-014273A, Sasaki.*
Machine translation of JP2002-182302A, Sasaki.*
Japanese Office Action Notice of Reasons for Rejection, Dec. 13, 2010.

* cited by examiner

*Primary Examiner* — Clayton E Laballe
*Assistant Examiner* — Linda B Smith
(74) *Attorney, Agent, or Firm* — Birch, Stewart, Kolasch & Birch, LLP

(57) ABSTRACT

The present invention provides a lens controller which electrically controls a focus and a zoom of a taking lens, the lens controller comprising: an AF control device which automatically controls the focus of the taking lens so that a given subject imaged by the taking lens is in focus; and a view angle correction device which keeps an angle of view of the taking lens constant by moving the zoom of the taking lens to prevent a variation of the angle of view associated with a movement of the focus moved by the AF control device; wherein, when the focus is moved by the AF control device, the view angle correction device detects a current position of the focus by a position detecting device, obtains a position of the zoom for preventing the variation of the angle of view based on the detected current position of the focus, and moves the zoom to the obtained position.

5 Claims, 4 Drawing Sheets

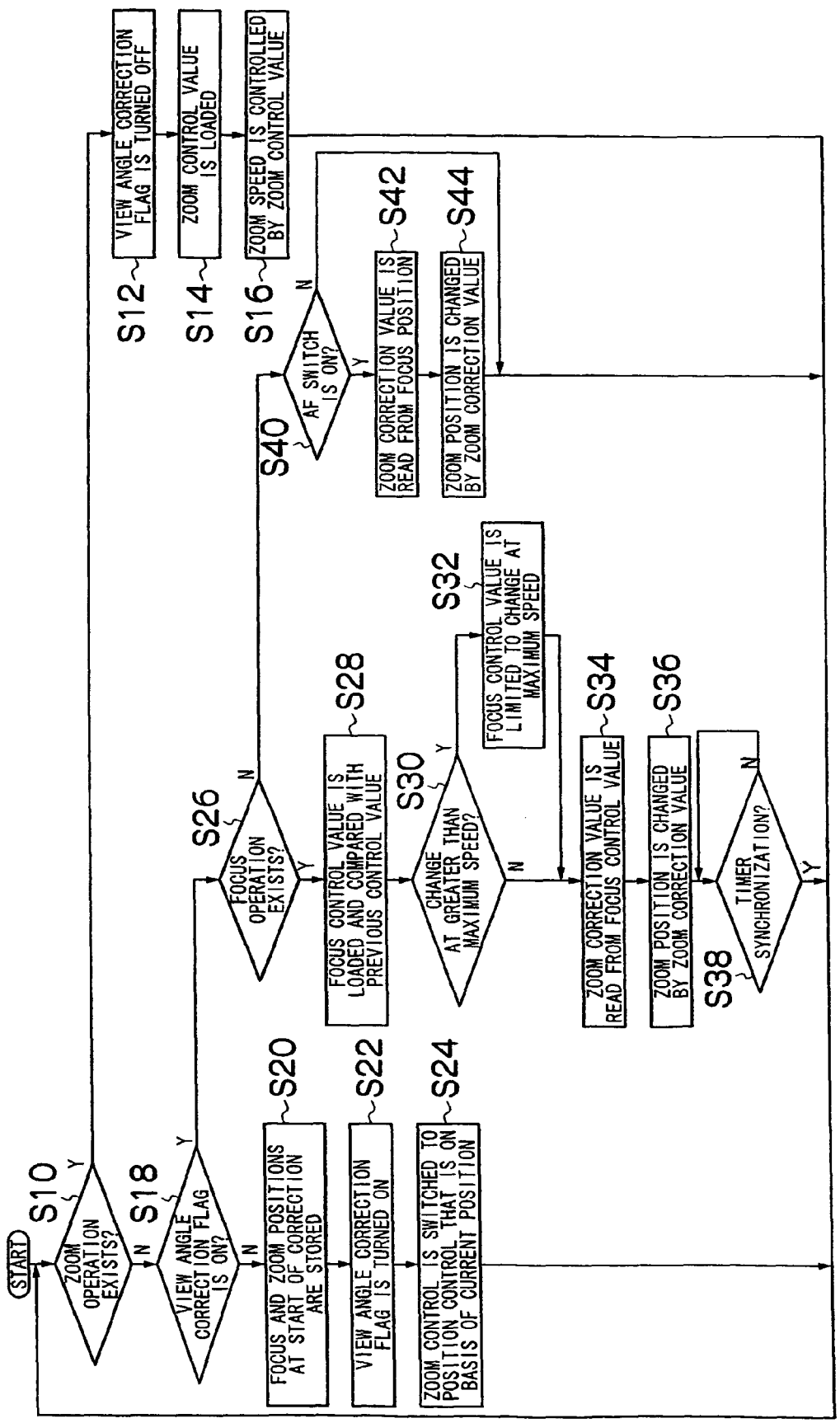

LENS CONTROLLER

BACKGROUND OF THE INVENTION

1. Field of the Invention

The present invention relates to a lens controller, and particularly to a lens controller having an auto focus (AF) function.

2. Description of the Related Art

There is known a television camera, video camera, or the like having an auto focus (AF) function which automatically controls a focus so that a subject is in focus. A method of AF employed in a television camera or video camera is typically a method referred to as a contrast method, which detects a contrast of a subject image based on a picture signal obtained by an image pickup element and controls a focus (focus lens) to maximize the contrast.

Additionally, a phenomenon called a pumping is conventionally known in which, when a focus is moved, an angle of view (focal length) is varied as though zooming is performed even though a zoom is fixed in a taking lens. To prevent such a pumping phenomenon, there is a known lens controller having a view angle correction (pumping correction) function which moves a zoom by a motor to prevent a view angle variation when a focus is moved (for example, see Japanese Patent Application Laid-Open No. 2001-42199).

SUMMARY OF THE INVENTION

In a lens controller having the view angle correction function as described above, when a focus is moved to a different position from a current position, a position of a zoom for preventing a view angle variation is obtained based on the position to which the focus is moved, and the zoom is moved to the obtained position.

On the other hand, as a scheme of focus control, there is known a scheme including an operating section such as a focus demand operated manually by an operator, a manual focus (MF) control which moves a focus to a target position indicated by a value of a focus control signal outputted from the operating section, and an AF control which automatically moves the focus so that a subject is in focus wherein these controls can be switched to be used.

In a case that the MF control is performed in the lens controller having the view angle correction function, because a position to which a focus is moved is determined from a value of a focus control signal provided from the operating section, a position of a zoom for preventing a view angle variation can be obtained based on the value of the focus control signal. However, in a case of the AF control, view angle correction cannot be performed in the same way as in the MF control because a position to which the focus is moved cannot be known. Conventionally, there is a disadvantage that a view angle variation associated with a movement of a focus occurs during AF control because view angle correction is not performed during AF control.

The present invention is made in view of such a circumstance and intended to provide a lens controller which can prevent a view angle variation associated with a movement of a focus during AF control.

To achieve the object, a lens controller according to a first aspect of the present invention is characterized in that the lens controller which electrically controls a focus and a zoom of a taking lens includes an AF control device which automatically controls the focus of the taking lens so that a given subject imaged by the taking lens is in focus, and a view angle correction device which keeps an angle of view of the taking lens constant by moving the zoom of the taking lens to prevent a variation of the angle of view associated with a movement of the focus moved by the AF control device.

According to the present invention, a view angle variation associated with a movement of a focus is prevented even during AF control.

A lens controller according to a second aspect of the present invention is the lens controller according to the first aspect characterized in that, when the focus is moved by the AF control device, the view angle correction device detects a current position of the focus by a position detecting device, obtains a position of the zoom for preventing the variation of the angle of view based on the detected current position of the focus, and moves the zoom to the obtained position. Since a target position of a focus is not specified during AF control while it is specified during MF control, the present invention is configured to detect a current position of the focus and obtain a position of a zoom for preventing a view angle variation based on the current position of the focus.

A lens controller according to a third aspect of the present invention is the lens controller according to the second aspect characterized by further including an MF control device which controls the focus of the taking lens to be in a target position specified based on a manual operation, wherein the view angle correction device obtains the position of the zoom for preventing the variation of the angle of view based on the target position and moves the zoom to the obtained position when the focus is moved by the MF control device. The present invention is configured to be able to correct an angle of view during both of MF control and AF control by obtaining a position of a zoom for preventing a view angle variation based on a current position of a focus during AF control and obtaining a position of the zoom for preventing a view angle variation based on a target position of the focus during MF control.

According to the lens controller in accordance with the present invention, a view angle variation associated with a movement of the focus can be prevented even during AF control.

BRIEF DESCRIPTION OF THE DRAWINGS

FIG. 4 is a flowchart which shows an operating procedure of a view angle correction process.

DETAILED DESCRIPTION OF THE PREFERRED EMBODIMENTS

Hereinafter, preferred embodiments for implementing the lens controller according to the present invention will be described in detail with reference to the accompanying drawings.

Figure 1:
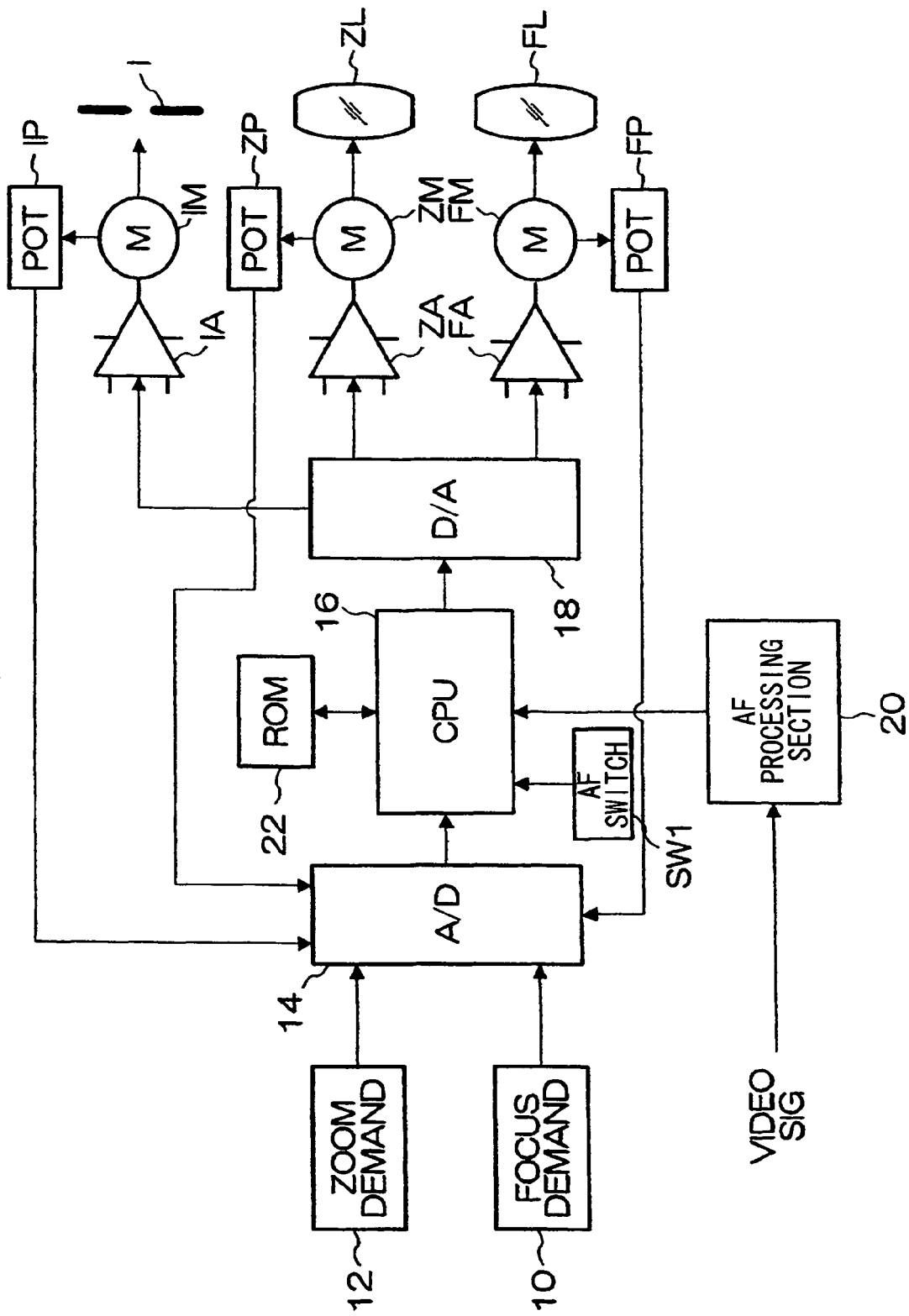
FIG. 1 is a block diagram which shows a configuration of a lens controller to which the present invention is applied.

FIG. 1 is a block diagram which shows a configuration of a lens controller to which the present invention is applied. The lens controller shown in FIG. 1 is a device for controlling a taking lens (an optical system of a lens apparatus) used in a television camera, video camera, or the like. In the taking lens, focus lens(es) FL which moves in the direction of the optical axis for adjusting focus, zoom lens(es) ZL which moves in the direction of the optical axis for adjusting zoom (adjusting a focal length), an iris I which performs a switching action for adjusting a quantity of light, and so on are provided. An object light incident on the taking lens is formed on an imaging surface (imaging plane) of an image pickup element of a camera body (camera head) (not shown) to which the taking lens is attached, photoelectrically converted by the image pickup element, and then subjected to a predetermined signal process by a signal processing section in the camera body. Thereby, a picture imaged by the image pickup element via the taking lens (a subject image) is obtained as a picture signal of a predetermined format (for example, NTSC system) by the camera body.

The focus lens FL, the zoom lens ZL, and the iris I are connected to corresponding motors, i.e., a motor for the focus FM, a motor for the zoom ZM, and a motor for the iris IM, respectively. By driving the motors FM, ZM, and IM, the focus lens FL is moved in the direction of the optical axis, the zoom lens ZL is moved in the direction of the optical axis, and the airs I performs a switching action, respectively.

In addition, the motors FM, ZM, and IM are connected to an amplifier for the focus FA, an amplifier for the zoom ZA, and an amplifier for the iris IA respectively, and each of the amplifiers FA, ZA, and IA is connected to a CPU 16 via a D/A converter 18. Drive signals having predetermined ranges of values for driving the focus lens FL, the zoom lens ZL, and the iris I respectively are outputted from the CPU 16, and then provided to the respective corresponding amplifiers FA, ZA, and IA via the D/A converter 18. Then, motors FM, ZM, and IM connected to the amplifier FA, ZA, and IA are driven at rotational speeds according to voltages of the corresponding drive signals; respectively.

Therefore, the CPU 16 is able to control rotational speeds of the motors FM, ZM, and IM by adjusting values of drive signals to be outputted to the amplifiers FA, ZA, and IA respectively so as to control operating speeds of the focus lens FL, the zoom lens ZL, and the iris I to be desired speeds (speed control).

In addition, a position of the focus lens FL relative to the direction of the optical axis, a position of the zoom lens ZL relative to the direction of the optical axis, and a position (a degree of opening/closing)of the iris I are detected by a focus position sensor FP, a zoom position sensor ZP, and an iris position sensor IP, respectively. Then, position signals for indicating these positions are provided from the position sensors FP, ZP, and IP via the A/D converter 14 to the CPU 16.

Thereby, the CPU 16 is able to control positions of the focus lens FL, the zoom lens ZL, and the iris I to be respective desired positions (position control) by adjusting drive signals outputted to the amplifiers FA, ZA, and IA so that positions (current positions) of the focus lens FL, the zoom lens ZL, and the iris I detected by the position sensor FP, ZP, and IP match target positions which have been set for the focus lens FL, the zoom lens ZL, and the iris I, respectively. For example, a position of an object of position control can be set to its target position by controlling a motor of the controlled object at a speed in a proportion to a difference between a current position and the target position of the controlled object and in a direction in which the difference between them will decrease.

On the other hand, controllers such as a focus demand 10 and a zoom demand 12 having operating sections operated manually by a user are connected to the CPU 16 via the A/D converter 14. For example, in the embodiment, the focus demand 10 outputs a control signal (focus control signal) having a value which indicates a position to be set (target position) of the focus lens FL according to an operation of its operating section, and the zoom demand 12 outputs a control signal (zoom control signal) having a value which indicates a movement speed to be set (target speed) of the zoom lens ZL according to an operation of its operating section. The focus control signal and the zoom control signal outputted from these controllers are provided to the CPU 16 via the A/D converter 14. In addition, the camera body or a predetermined controller (not shown) outputs a control signal (iris control signal) having a value which indicates a position to be set (target position) of the iris I, and the iris control signal is provided to the CPU 16.

The focus lens FL, the zoom lens ZL, and the iris I are controlled based on the focus control signal, the zoom control signal, and the iris control signal which are provided to the CPU 16 as described above. In the embodiment, a value of the focus control signal is obtained as a value which indicates a target position of the focus lens FL by the CPU 16, and the position of the focus lens FL is controlled to match the target position. A value of the zoom control signal is obtained as a value which indicates a target speed of the zoom lens ZL, and the movement speed of the zoom lens ZL is controlled to match the target speed. A value of the iris control signal is obtained as a value which indicates a target position of the iris I by the CPU 16, and the position of the iris I is controlled to match the target position.

In addition, in the lens controller, a control scheme of the focus lens FL (focus control scheme) can be switched between manual focus (MF) control which controls the focus lens FL according to a focus control signal from the focus demand 10 as described above and auto focus (AF) control which controls the focus lens FL so that a given subject is in focus based on a signal provided from the AF processing section 20 as described later. In the embodiment, an automatic reset pushbutton (AF switch SW1) for switching between the MF control and the AF control is provided in a predetermined portion of the focus demand 10 or the like. When the pushbutton has not been pressed (the AF switch SW1 is off), the MF control is selected, and, only when the pushbutton has been pressed (the AF switch SW1 is on), the AF control is selected. A signal which indicates on/off status of the AF switch SW1 is provided to the CPU 16, and the CPU 16 performs a process for the MF control (MF process) when the AF switch SW1 is off, and performs a process for the AF control (AF process) when the AF switch SW1 is on.

During the MF control (MF process), the CPU 16 controls the focus lens FL based on the focus control signal from the focus demand 10 as described above. On the other hand, during the AF control (AF process), a focus estimation value which indicates a degree of contrast of a subject image being photographed is obtained from the AF processing section 20, and the focus lens FL is controlled to maximize the focus evaluation value.

A picture signal (luminance signal) sequentially obtained from imaging by the image pickup element of the camera body (not shown) is inputted to the AF processing section 20. In the AF processing section 20, although the detailed description is omitted, a high frequency component signal is extracted from such an inputted picture signal, and integrated for each frame (field) image (image of one screen) sequentially inputted as a picture signal. Additionally, in a case where an area of a subject to be focused (AF area) is limited to an area of a portion of a screen, only high frequency component signals within the AF area are integrated. A value obtained by integration for each frame as described above indicates a degree of contrast of a subject image and is outputted as a focus evaluation value from the AF processing section 20.

During the AF control, the CPU 16 obtains a focus evaluation value calculated by the AF processing section 20, and moves the focus lens FL, for example, in a direction in which the focus evaluation value will increase until an increase of the focus evaluation value is not detected. Thereby, the focus lens FL is moved to a position where the focus evaluation value is maximized, that is, a focusing position.

A view angle correction process which prevents a view angle variation associated with a movement of the focus lens FL will now be described. In the taking lens described above, when the focus lens FL is moved, a phenomenon called a pumping occurs in which an angle of view (focal length) is varied even though a position of the zoom lens ZL is fixed. Therefore, when the CPU 16 moves the focus lens FL by the MF process or the AF process, the CPU 16 performs the view angle correction process which moves the zoom lens ZL along with a movement of the focus lens FL to prevent a variation of an angle of view.

Figure 2:
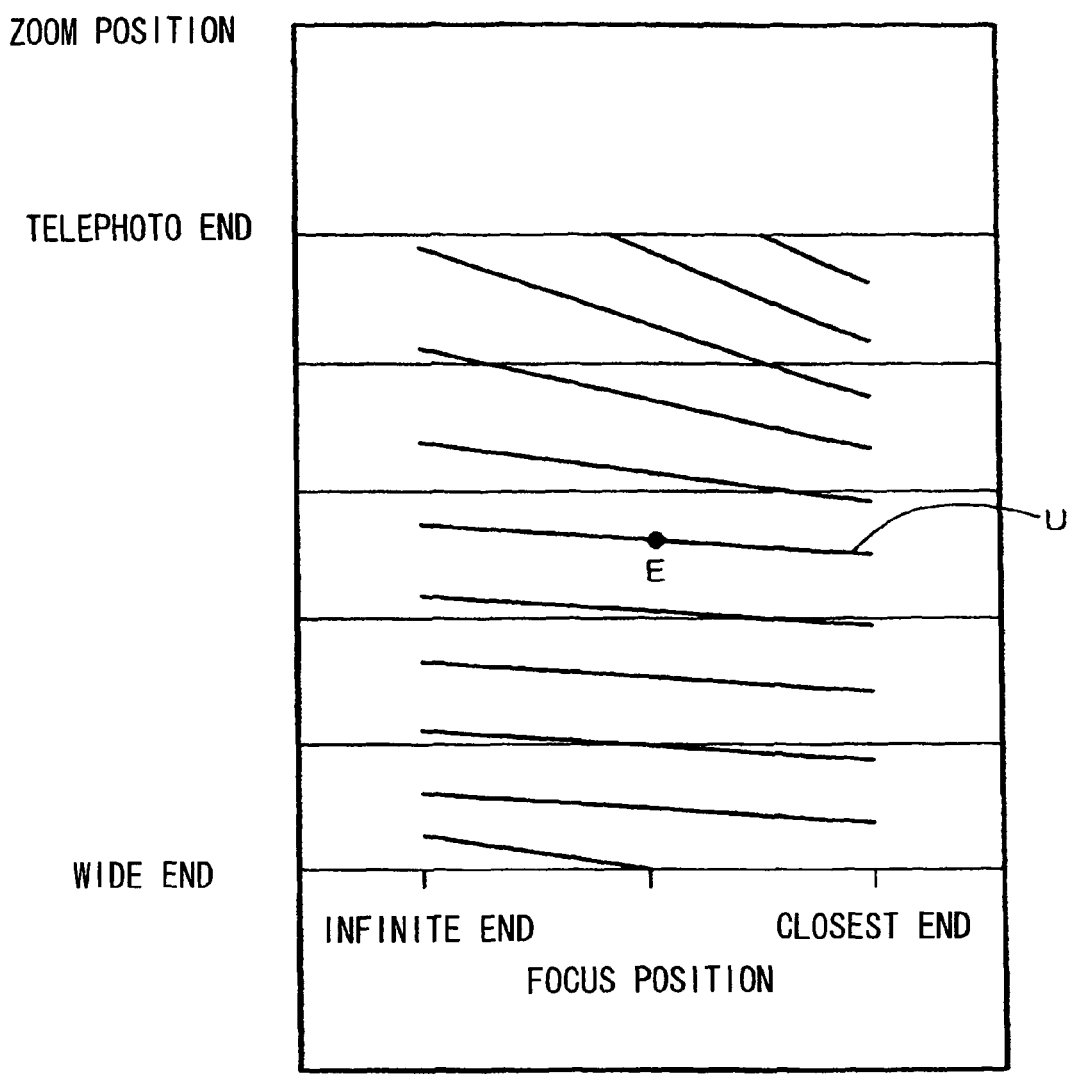
FIG. 2 is a schematic diagram used for illustrating view angle correction data.

In FIG. 1, the ROM 22 is connected to the CPU 16 so that the CPU 16 can read data therefrom, and data for view angle correction (view angle correction data) which indicates a relation between a focus and a zoom as shown in a graph of FIG. 2 is previously stored in the ROM 22. In FIG. 2, the abscissa indicates a position of the focus lens FL (focus position), the ordinate indicates a position of the zoom lens ZL (zoom position), and a constant view angle curve (or line) indicates a relationship between a focus position and a zoom position where an angle of view is constant when the focus lens FL is moved from the infinite end to the closest end. For example, in FIG. 2, the point E on a constant view angle curve U is assumed to be current focus and zoom positions. Then, it is shown that an angle of view is kept constant when the zoom position is changed along the constant view angle curve U as the focus lens FL is moved to the infinite end or the closest end. Although discrete constant view angle curves are shown discretely in FIG. 2, for every point on the coordinate plane, there is a constant view angle curve passing through it.

The view angle correction data which indicates a relationship between a focus position and a zoom position as described above is previously created to be adapted to characteristics of a taking lens and stored in the ROM 22. The view angle correction data may represent a relationship between a focus position and a zoom position of each constant view angle curve as mathematical expression data or may represent it as specific numerical values (a data table). In addition, data for all-constant view angle curves does not necessarily have to be stored in the ROM 22. Data for discrete constant view angle curves as in FIG. 2 may be recorded as mathematical expression data or numerical values such that other constant view angle curves can be calculated as required using interpolation or the like by the CPU 16.

When a zoom operation is performed using the operating section of the zoom demand 12 as described above, the CPU 16 moves the zoom lens ZL according to the zoom operation. In other words, the zoom lens ZL is moved at a target speed indicated by a value of a zoom control signal (zoom control value) outputted from the zoom demand 12. Then, when the zoom operation is stopped and thus the zoom lens ZL is stopped at a given position, a focus position and a zoom position detected by the focus position sensor FP and the zoom position sensor ZP at that time are set (stored) as a focus position and a zoom position at the start of a correction operation. In addition, a focus position and a zoom position at the start of the correction operation are updated each time the zoom lens ZL is moved by a zoom control signal from the zoom demand 12.

On the other hand, during the MF control (MF process), when a focus operation is performed using the operating section of the focus demand 10, i.e., a value of a focus control signal (focus control value) from the focus demand 10 is changed, a position of the zoom lens ZL (zoom correction position) for preventing a view angle variation at the time when the focus lens FL is moved to its target position is obtained using view angle correction data stored in the ROM 22. In other words, when the focus lens FL is moved to the target position indicated by the focus control value, a value for matching the angle of view at such a time with a current angle of view (an angle of view at a focus position and a zoom position at the start of the correction operation) is obtained as the zoom correction position. Supposing that a displacement amount from a zoom position at the start of the correction operation to the zoom correction position is referred to as a zoom correction value, the zoom correction value is actually obtained instead of the zoom correction position.

Upon obtaining the zoom correction value, the CPU 16 starts a process for moving the focus lens FL to the target position indicated by focus control value from the focus demand 10 as well as starts a process for moving the zoom lens ZL to the zoom position (zoom correction position) which is the zoom position at the start of the correction operation shifted by the zoom correction value. Additionally, the zoom control in this case is a position control that is on the basis of the zoom position at the start of the correction operation, and the CPU 16 moves the zoom lens ZL so that a current zoom position value that is on the basis of the zoom position (0) at the start of the correction operations matches the zoom correction value while obtaining the current zoom position from the zoom position sensor ZP.

Figure 3:
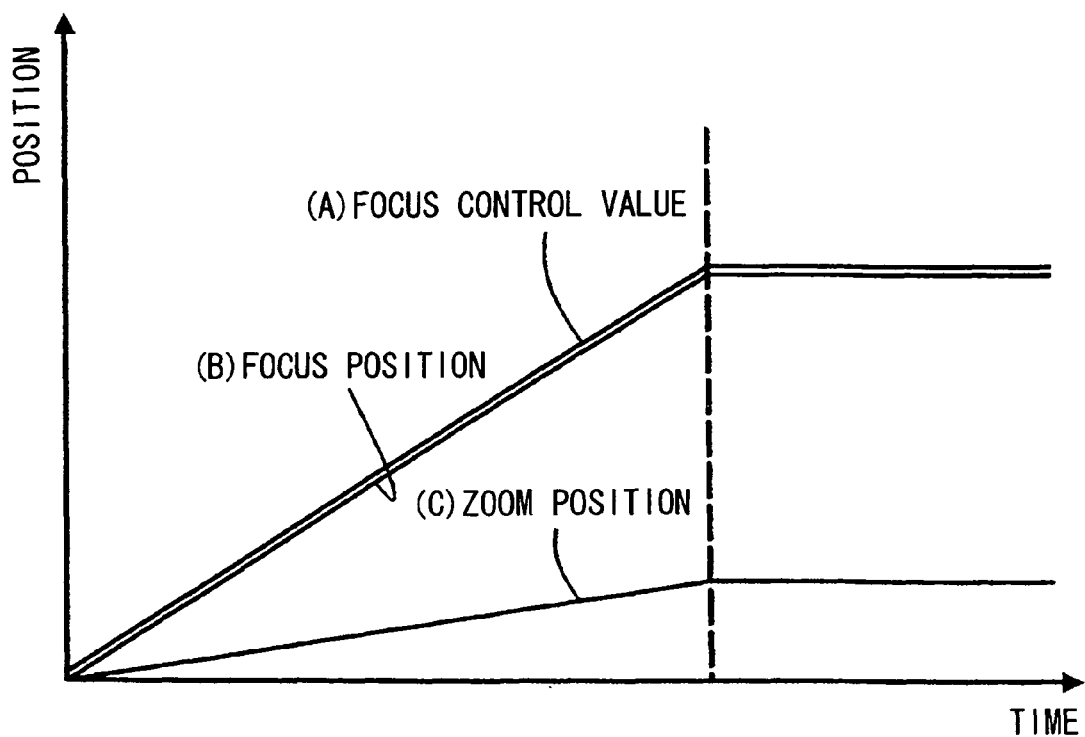
FIG. 3 is a schematic diagram used for illustrating a view angle correction operation.

According to such a view angle correction process, a focus position (B) is changed along with a change of the focus control value (A) and a zoom position (C) is synchronously changed as shown in FIG. 3 so that an angle of view to be photographed is kept constant even in a transition period while the focus lens FL is moving.

In addition, in the case that a zoom correction value is obtained based on a focus control value as described above, an excessive correction in which a view angle correction exceeds an actual change of a focus position may occur if a change rate of the focus control value is large. In other words, when the change rate of the focus control value is large such that the change rate exceeds an allowable maximum speed as a movement speed of the focus lens FL, an actual movement speed of the focus lens FL is limited by a maximum speed and thereby the focus position cannot follow the focus control value. On the other hand, because a zoom correction value for the view angle correction is small, the zoom position can follow the change of the focus control value. Therefore, the view angle correction is performed ahead of the movement of the focus lens.

Therefore, to prevent such a excessive correction, if a focus speed at a time when the focus lens FL is moved so that follows a focus control value provided from the focus demand 10 exceeds the maximum speed, the CPU 16 changes the focus control value so that the focus speed becomes the maximum speed. For example, during the MF control, in the case that a position control is performed in which a movement speed of the focus lens FL is obtained based on a difference between a focus control value and a current focus position, and the focus lens FL is moved at the obtained movement speed and thereby the focus lens FL is moved to a target position indicated by the focus control value, if the movement speed of the focus lens FL obtained based on the difference between the focus control value and the current focus position exceeds the maximum speed, the focus control value is changed to a value at which the movement speed of the focus lens FL is the maximum speed.

Then, a zoom correction value is obtained based on the changed focus control value, and the zoom lens ZL is moved along with the focus lens FL by the obtained zoom correction value. This prevents a problem of excessive correction because the zoom lens ZL is moved, according to a change of the actual focus position, to a position for preventing a view angle variation due to the change of the focus position.

Compared to the view angle correction process during the MF control as described above, a view angle correction process during the AF control (AF process) is performed as below. During the AF control, the focus lens FL is controlled according to information of a focus evaluation value from the AF processing section 20. At this time, because a signal which indicates a target position of the focus lens FL such as a focus control signal is not provided from outside to the CPU 16, a zoom correction value for preventing a view angle variation associated with a movement of the focus lens FL is obtained based on a current focus position detected by the focus position sensor FP instead of the focus control signal. Thus, while obtaining a current focus position by the focus position sensor FP, the CPU 16 obtains a zoom correction value by which an angle of view at the current focus position matches an angle of view at a focus position and a zoom position at the start of the correction operation, using view angle correction data stored in the ROM 22. Then, the zoom lens ZL is moved so that a value of the current zoom position that is on the basis of the zoom position at the start of the correction operation matches the zoom correction value.

FIG. 4 is a flowchart which shows an operating procedure of the view angle correction process described above. At first, the CPU 16 determines whether a zoom operation exists or not based on a value of a zoom control signal (zoom control value) from the zoom demand 12 (step S10). When the determination is YES, a view angle correction flag is turned off (step S12), and the zoom control value is loaded from the zoom demand 12 (step S14). Then, a speed of the zoom lens ZL is controlled according to the zoom control value (step S16).

On the other hand, when it is determined that NO, i.e., the zoom operation does not exist at step S10, whether or not the view angle correction flag is on is determined (step S18). When the determination at step S18 is NO, a zoom position and a focus position at the start of the correction operation are stored (step S20). Then, the view angle correction flag is turned on (step S22), the zoom lens ZL is switched to a position control that is on the basis of a current position (step S24), and the process is returned to step S10.

If the determination at the step S18 is YES, i.e., the zoom operation is stopped and the view angle correction flag is turned on, then whether or not a focus operation exists is determined based on a value of a focus control signal (focus control value) from the focus demand 10 (step S26). When the determination is YES, the focus control value is loaded and compared with the focus value loaded at previous time (step S28). In this situation, if a focus control value loaded at previous time is changed at step S32 described below, the changed focus control value is set as the focus control value loaded at previous time.

As a result of this comparison, whether or not a change from the focus control value at previous time to the focus control value at this time is a change which requires a focus speed greater than a maximum speed is determined (step S30). If the determination is YES, the focus control value is changed to be limited so that the focus speed becomes the maximum speed. Thus, in the case that the focus speed is set to the maximum speed, the focus control value at this time is changed to a focus control value whose target position is a focus position at which the focus lens FL arrives when a focus control value is loaded at next time (step S32). On the other hand, the determination at step S30 is NO, the processing at step S32 is not performed.

Next, the CPU 16 reads a zoom correction value for preventing a view angle variation from the focus position and zoom position at the start of the correction operation stored at the step S20 and the focus control value with reference to view angle correction data stored in the ROM 22 (step S34). Then, along with a movement of the focus lens FL based on the focus control value, the zoom lens ZL is moved to the zoom position which is the zoom position at the start of the correction operation shifted by the zoom correction value (step S36). After this processing, if it is determined that a predetermined time has passed according to timer synchronization (step S38), the process returns to the step S10.

If it is determined that NO, i.e., the focus operation is not performed at the step S26, then whether or not the AF switch SW1 has been on is determined (step S40). If the determination at the step S40 is NO, the process returns to step S10. On the other hand, if YES, then an AF process not shown in the flowchart is performed. Then, during the AF process, the CPU 16 loads a position of the focus lens FL (current focus position) from the focus position sensor FP, and reads a zoom correction value for preventing a view angle variation from the focus position and zoom position at the start of the correction operation stored at the step S20 and the current focus-position with reference to the view angle correction data stored in the ROM 22 (step S42). Then, the zoom lens ZL is moved to the zoom position which is the zoom position at the start of the correction operation shifted by the zoom correction value (step S44). After this processing, the process returns to step S10.

In the above described embodiment, control is switched from the MF control to the AF control only when the AF switch SW1 has been pressed, but switching between the MF control and the AF control may be implemented in any manner. For example, an MF mode which performs the MF continuously control and an AF mode which performs the AF continuously control may be switched by a given switch.

Additionally, in the above described embodiment, a current focus position is read from the focus position sensor FP and a zoom correction value for the current focus position is obtained from view angle correction data during the AF control, but a zoom correction value during the AF control may be obtained by other methods. For example, when the CPU 16 controls the focus lens FL by speed control, because a focus position after a predetermined time can be predicted using a movement speed (target speed) of the focus lens FL, a zoom correction value for the focus position after the predetermined time may be obtained from view angel correction data.

What is claimed is:

1. A lens controller which electrically controls a focus and a zoom of a taking lens, the lens controller comprising:
   an AF control device which automatically controls the focus of the taking lens so that a given subject imaged by the taking lens is in focus; and
   a view angle correction device which keeps an angle of view of the taking lens constant by moving the zoom of the taking lens to prevent a variation of the angle of view associated with a movement of the focus moved by the AF control device, wherein
   when the focus is moved by the AF control device, the view angle correction device detects a current absolute position of the focus by a position detecting device, obtains a position of the zoom for preventing the variation of the angle of view associated with the movement of the focus moved by the AF control device based on the detected current absolute position of the focus and according to previously stored view angle correction data, and moves the zoom to the obtained position, and the view angle correction device obtains the position of the zoom for preventing the variation of the angle of view by interpolating a relationship between focus positions and corresponding zoom positions for which the variation of the angle of view is prevented, based on the view angle correction data.

2. The lens controller according to claim 1, further comprising an MF control device which controls the focus of the taking lens to be in a target focus position specified based on a manual operation, wherein the view angle correction device obtains the position of the zoom for preventing the variation of the angle of view based on the target focus position and moves the zoom to the obtained position when the focus is moved by the MF control device.

3. The lens controller according to claim 1, wherein the view angle correction data comprises mathematic expression data, and the relationship between focus positions and zoom positions for preventing the variation of the angle of view comprises a constant view angle curve calculated by interpolation based on the mathematical expression data.

4. A method for controlling a focus and a zoom of a taking lens to prevent a variation of the angle of view associated with a movement of the focus, comprising:

when the focus is moved by an AF control device which automatically controls the focus of the taking lens so that a given subject imaged by the taking lens is in focus, detecting a current absolute position of the focus;

obtaining a position of the zoom for preventing the variation of the angle of view associated with the movement of the focus moved by the AF control device based on the current absolute position of the focus, according to previously stored view angle correction data; and moving the zoom to the obtained position, wherein obtaining the position of the zoom for preventing the variation of the angle of view comprises interpolating a relationship between focus positions and corresponding zoom positions for which the variation of the angle of view is prevented, based on the view angle correction data.

5. The method according to claim 4, further comprising:

when the focus is moved by an MF control device which controls the focus of the taking lens to be in a target focus position specified based on a manual operation, obtaining the position of the zoom for preventing the variation of the angle of view based on the target focus position, and moving the zoom to the obtained position.

\* \* \* \* \*